United States Patent [19]

Conrow et al.

[11] 4,049,640

[45] Sept. 20, 1977

[54] SUBSTITUTED BISNAPHTHYLAZO DIPHENYL UREIDO COMPLEMENT INHIBITORS

[75] Inventors: Ransom Brown Conrow, Pearl River; Seymour Bernstein, New City; Norman Bauman, Nanuet, all of N.Y.

[73] Assignee: American Cyanamid Company, Stamford, Conn.

[21] Appl. No.: 640,100

[22] Filed: Dec. 12, 1975

[51] Int. Cl.$^2$ .................... C07C 107/08; C09B 43/14; A61K 31/655
[52] U.S. Cl. .................................. 260/175; 260/199; 260/515 A; 260/519; 260/520 R; 424/14; 424/19; 424/21; 424/31; 424/226
[58] Field of Search ........................................ 260/175

[56] References Cited

U.S. PATENT DOCUMENTS

| 687,171 | 11/1901 | Ulrich et al. | 260/175 |
|---|---|---|---|
| 1,009,740 | 11/1911 | Gunther | 260/175 |
| 3,211,554 | 10/1965 | Dreyfus | 260/175 X |

FOREIGN PATENT DOCUMENTS

| 10,378 | 7/1902 | Austria | 260/175 |
|---|---|---|---|
| 447,199 | 12/1912 | France | 260/175 |
| 131,513 | 3/1901 | Germany | 260/175 |
| 27-2687 | 3/1952 | Japan | 260/175 |
| 467,312 | 2/1969 | Switzerland | 260/175 |
| 18,649 of | 1912 | United Kingdom | 260/175 |

OTHER PUBLICATIONS

Colour Index, vol. 4, 3rd Edition, p. 4221, Nos. 25375 and 25380, (1971).
Farben (III), Chemical Abstracts, vol. 67, No. 33824h, (1967).
Williams et al., Chemical Abstracts, vol. 74, No. 59392k, (1971).
Lambert et al., Chemical Abstracts, vol. 46, No. 11393c, (1952).
Pruglo et al., Zh. Nauch. Priul. Kine., vol. 10, No. 5, pp. 360 to 365, (1965).

*Primary Examiner*—Floyd D. Higel
*Attorney, Agent, or Firm*—Jack W. Richards

[57] ABSTRACT

[Ureylenebis-(carboxy-phenyleneazo)]bis[amino-hydroxy-naphthoic acids] and salts useful as complement inhibitors.

3 Claims, No Drawings

SUBSTITUTED BISNAPHTHYLAZO DIPHENYL UREIDO COMPLEMENT INHIBITORS

BACKGROUND OF THE INVENTION

The present invention resides in the concept of certain substituted bisnaphthylazo diphenyl ureido acids and salts and their use as inhibitors of the complement system of warm-blooded animals.

The term "complement" refers to a complex group of proteins in body fluids that, working together with antibodies or other factors, play an important role as mediators of immune allergic, immunochemical and/or immunopathological reactions. The reactions in which complement participates takes place in blood serum or in other body fluids, and hence are considered to be humoral reactions.

With regard to human blood, there are at present more than 11 proteins in the complement system. These complement proteins are designated by the letter C and by number: C1, C2, C3 and so on up to C9. The complement protein C1 is actually an assembly of subunits designated C1g, C1r, and C1s. The numbers assigned to the complement proteins reflect the sequence in which they become active, with the exception of complement protein C4, which reacts after C1 and before C2. The numerical assignments for the proteins in the complement system were made before the reaction sequence was fully understood. A more detailed discussion of the complement system and its role in body processes can be found in, for example, *Bull. World Health Org.*, 39 935-938 (1968); *Scientific American*, 229, (No. 5), 54-66 (1973); *Medical World News*, October 11, 1974, pp. 53-58; 64-66; *Harvey Lectures*, 66, 75-104 (1972); *The New England Journal of Medicine*, 287, 489-495; 545-549; 592-596; 642-646 (1972); *The Johns Hopkins Med. J.* 128, 57-74 (1971); and *Federation Proceedings*, 32, 134-137 (1973).

The complement system can be considered to consist of three sub-systems: (1) a recognition unit (C1g) which enables it to combine with antibody molecules that have detected a foreign invader; (2) an activation unit (C1r, C1s, C2, C4, C3), which prepares a site on the neighboring membrane; and (3) an attack unit (C5, C6, C7, C8 and C9) which creates a "hole" in the membrane. The membrane attack unit is non-specific; it destroys invaders only because it is generated in their neighborhood. In order to minimize damage to the host's own cells, its activity must be limited in time. This limitation is accomplished partly by the spontaneous decay of activated complement and partly by interference by inhibitors and destructive enzymes. The control of complement, however, is not perfect, and there are times when damage is done to the host's cells. Immunity is therefore a double-edged sword.

Activation of the complement system also accelerates blood clotting. This action action comes about by way of the complement-mediated release of a clotting factor from platelets. The biologically active complement fragments and complexes can become involved in reactions that damage the host's cells, and these pathogenic reactions can result in the development of immune-complex diseases. For example, in some forms of nephritis complement damages that basal membrane of the kidney, resulting in the escape of protein from the blood into the urine. The disease disseminated lupus erythematosus belongs in this category; its syptoms include nephritis, visceral lesions and skin eruptions. The treatment of diphtheria or tetanus with the injection of large amounts of anti-toxin sometimes results in serum sickness, an immune-complex disease. Rheumatoid arthritis also involves immune complexes. Like disseminated lupus erythematosus, it is an autoimmune disease, in which the disease symptoms are caused by pathological effects of the immune system in the host's tissues. In summary, the complement system has been shown to be involved with inflammation, coagulation, fibrinolysis, antibody-antigen reactions and other metabolic processes.

In the presence of antibody-antigen complexes the complement proteins are involved in a series of reactions which may lead to irreversible membrane damage if they occur in the vicinity of biological membranes. Thus, while complement constitutes a part of the body's defense mechanism against infection, it also results in inflammation and tissue damage in the immunopathological process. The nature of certain of the complement proteins, suggestions regarding the mode of complement binding to biological membranes and the manner in which complement effects membrane damage are discussed in *Annual Review in Biochemistry*, 38, 389 (1969).

A variety of substances have been disclosed as inhibiting the complement system, i.e., as complement inhibitors. For example, the compounds 3,3'-ureylenebis[6-(2-amino-8-hydroxy-6-sulfo-1-naphthlazo)]benzenesulfonic acid tetrasodium salt (chlorazol fast pink), heparin and a sulphated dextran have been reported to have an anticomplementary effect, *British Journal of Experimental Pathology*, 33, 327-339 (1952). The compound 8,8'-[ureylenebis[m-phenylenecarbonylimino(4-methyl-m-phenylene)carbonylimino]]di-1,3,5-naphthalenetrisulfonic acid, hexasodium salt (Suramin Sodium) is described as a competitive inhibitor of the complement system, *Clin. Exp. Immunol.*, 10, 127-138 (1972). German Pat. No. 2,254,893 or South African Pat. No. 727,923 discloses certain 1-(diphenylmethyl)-4-(3-phenylally)piperazines useful as complement inhibitors. Other chemical compounds having complement inhibiting activity are disclosed in, for example, *Journal of Medicinal Chemistry*, 12, 415-419, 902-905, 1049-1052, 1053-1056 (1969); *Canadian Journal of Biochemistry*, 47, 547-552 (1969); *The Journal of Immunology*, 93, 629-640 (1964); The *Journal of Immunology*, 104, 279-288 (1970); *The Journal of Immunology* 106, 241-245 (1971); and *The Journal of Immunology*, 111, 1061-1066 (1973).

It has been reported that the known complement inhibitors epsilon-aminocapronic acid, Suramin Sodium and tranexamic acid have been used with success in the treatment of hereditary angioneurotic edema, a disease state resulting from an inherited deficiency or lack of function of the serum inhibitor of the activated first component of complement (C1 inhibitor), *The New England Journal of Medicine*, 286, 808-812 (1972); *Allergol, Et. Immunopath*, II, 163-168 (1974); and *J. Allergy Clin. Immunol.*, 53, No. 5 298-302 (1974).

SUMMARY OF THE INVENTION

It has now been discovered that certain substituted bisnaphthylazodiphenyl ureido compounds interact with the complement reaction sequence, thereby inhibiting complement activity in body fluids.

This invention is particularly concerned with compounds having complement inhibiting activity of the general formula (I):

(I)

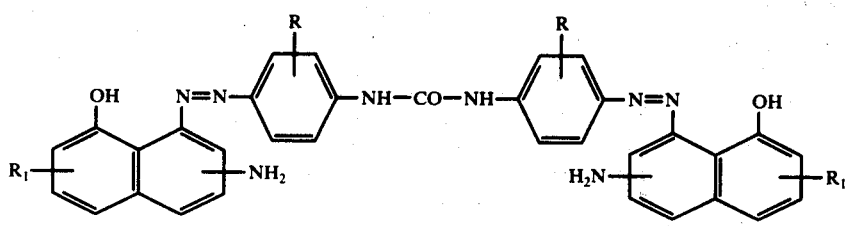

wherein R and $R_1$ are each selected from the group —$SO_3A$ and —$CO_2A$, wherein A is H, Na (sodium) and K (potassium) with the proviso that A is identical in the same compound and when A is sodium, R and $R_1$ are not both —$SO_3Na$ in the same compound when the —$SO_3Na$ groups are on the number 6-position of the ureylene and naphthyl ring systems and each —$NH_2$ group is on the number 2-position of the naphthyl ring systems.

Of particular interest in the above general formula (I) are the group of compounds wherein A is Na and, within this group, those compounds of most interest are those of the general formula (II):

The products of the present invention may be prepared by diazotizing a nitro-substituted anthranilic or aminobenzenesulfonic acid and treating with 7-amino-1-naphthol-3-sulfonic acid or 6-amino-4-hydroxy-2-naphthoic acid to give 2-(substituted-1-naphthylazo)-4-(or 5)-nitrobenzoic acids or substituted 5-(2-carboxy or 2-sulfo-4-nitrophenylazo)-2-naphthoic acids. This nitro derivative is treated with sodium suflide to produce the corresponding amino derivative. Treatment of the amino derivative with phosgene produces the desired product. Acidification will produce the free acid.

This invention is also concerned with a method of inhibiting the complement system in a body fluid, such (II)

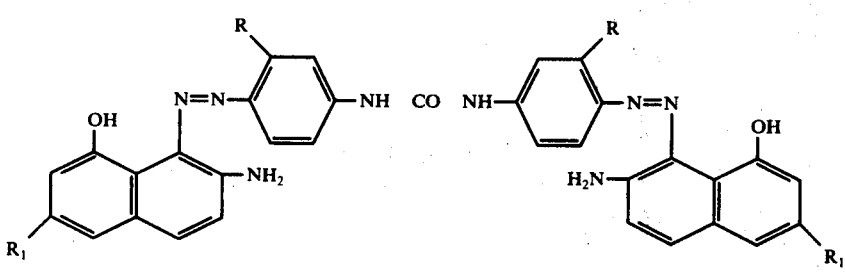

wherein R and $R_1$ are each selected from the group —$SO_3Na$ and —$CO_2Na$, with the proviso that R and $R_1$ are not both —$SO_3Na$ in the same compound.

Representative compounds encompassed within this invention include, for example, 5,5'-[Ureylenebis(2-carboxy—p-phenyleneazo)]bis[6-amino-4-hydroxy-2-naphthoic acid], tetrasodium salt; 4,4'-Ureylenebis[2-(2-amino-8-hydroxy-6-sulfo-1-naphthylazo)benzoic acid], tetrasodium salt; 5,5'-[Ureylenebis(2-sulfo-p-phenyleneazo)]bis[6-amino-4-hydroxy-2-naphthoic acid], tetrasodium salt.

The closest known compound to those of the present invention, and disclosed as having anticomplementary effect, is the compound, 3,3'-ureylenebis[6-(2-amino-8-hydroxy-6-sulfo-1-naphthylazo)benzenesulfonic acid]-tetrasodium salt (chlorazol fast pink), British Journal of Experimental Pathology, 33, 327–339 (1952). Other known compounds, not known as having anticomplementary effect, are 3,3'-ureylenebis[6-(2-amino-6-sulfo-1-naphthylazobenzenesulfonic acid)]tetrasodium salt, Chemical Abstracts, 64: 5990 f (1966); and 3-sulfo-7-amino-8-(2'sulfo-4'-aminophenylazo)-1-naphthol, 5-(4-acetonido-2-sulfophenylazo)-5-amino-4-hydroxy-2-naphthalenesulfonic acid, disodium salt, 6-amino-5-(4-benzamido-2-sulfophenylazo)-4-hydroxy-2-naphthalenesulfonic acid, disodium salt, 3,3'-oxalyldiimino) bis[6-(2-amino-8-hydroxy-6-sulfo-1-naphthylazo)-benzenesulfonic acid]tetrasodium salt, 5,5'-(succinyldiimino)bis-[6-(2-amino-8-hydroxy-6-sulfo-1-naphthylazo)-benzenesulfonic acid]tetrasodium salt, all found in Chemical Abstract, 48: 10646 h (1954).

as blood serum, which comprises subjecting body fluid complement to the action of an effective complement inhibiting amount of a compound encompassed with formulae (I) and (II) hereinabove. The method of use aspect of this invention is also concerned with a method of inhibiting the complement system in a warm-blooded animal which comprises internally administering to said animal an effective complement inhibiting amount of a compound encompassed within formulae (I) and (II) hereinabove. Body fluid can include blood, plasma, serum, synovial fluid, cerebrospinal fluid, or pathological accumulations of fluid such as pleural effusion, etc.

The compounds of the present invention find utility as complement inhibitors in body fluids and as such may be used to ameliorate or prevent those pathological reactions requiring the function of complement and in the therapeutic treatment of warm-blooded animals having immunologic diseases such as rheumatoid arthritis, systemic lupus erythematosus, certain kinds of glomerulonehritis, certain kinds of auto-allergic hemolytic anemia, certain kinds of platelet disorders and certain kinds of vasculitis. The compounds herein may also be used in the therapeutic treatment of warm-blooded animals having non-immunologic diseases such as paroxysmal nocturnal hemoflobinuria, hereditary angioneurotic edema (treated with Suramin Sodium, etc.) and inflammatory states induced by the action of bacterial of lysosomal enzymes on the appropriate complement components as for example, inflammation following coronary occlusion. They may also be useful in the treatment of transplant rejection.

DETAILED DESCRIPTION OF THE INVENTION

The following examples will serve to illustrate the invention in more detail.

EXAMPLE 1

3,3'-UREYLENEBIS[6-(2-Amino-8-Hydroxy-6-sulfo-1-naphthylazo)benzoic acid], tetrasodium salt To a filtered solution of 18.2 g of 5-nitroanthranilic acid in 300 ml of water and 22 ml of 5N sodium hydroxide is added 6.9 g of sodium nitrite. The resulting, slightly warm solution is poured over a rapidly stirred mixture of 34.0 ml of concentrated hydrochloric acid, 50 ml of acetic acid, 350 g of ice and 100 ml of water in a 2 liter beaker. This mixture is stirred in an ice bath during preparation of a solution of the sodium salt of 7-amino-1-naphthol-3-sulfonic acid (gamma acid). Thus, to a solution of 28 g of 85% pure 7-amino-1-naphthol-3-sulfonic acid in 50 ml of water and 24 ml of 5N sodium hydroxide is added 30 g of sodium acetate trihydrate in 30 ml of water. The resulting solution is added to the rapidly stirred diazonium salt solution and the mixture is stirred for approximately 5 minutes then is heated to 90° C and allowed to stand overnight at room temperature. The mixture is filtered and the product is washed with a small amount of water. The product if then dissolved in 1300 ml of hot water and filtered through a steam heated, sintered funnel. To the filtrate maintained at 80° C is added 140 g of sodium formate. The mixture is cooled to room temperature and is filtered. The product is washed with a 10% aqueous solution of sodium formate followed by ethanol to give 2-(2-amino-8-hydroxy-6-sulfo-1-naphthylazo)-5-nitrobenzoic acid, 6'-sodium salt.

A mixture of 20 g of the above product, 23.2 g of sodium sulfide nonahydrate and 300 ml of water is heated on a steam bath for 20 minutes, the resulting solution is filtered through diatomaceous earth and is washed with 150 ml of water. To the filtrate is added 10 ml of 88% formic acid, the mixture is filtered and the product is washed thoroughly with water. The product is dissolved in 650 ml of water plus 68 ml of saturated sodium bicarbonate solution, the solution is then filtered through diatomaceous earth. To the filtrate is added 4.0 ml of 88% formic acid.

The mixture is filtered and dried and a 2.54 g portion of the product is dissolved in 30 ml of water plus 2.5 ml of 5N sodium hydroxide, the solution is filtered and the filtrate is evaporated to a paste. The paste is diluted with ethanol, is filtered and washed thoroughly with ethanol then dried overnight over phosphorus pentoxide at reduced pressure and elevated temperature to give 5-amino-2-(2-amino-8-hydroxy-6-sulfo-naphthylazo)benzoic acid, disodium salt.

A solution of 10.0 of the preceding product and 8.5 g of sodium bicarbonate in 250 ml of water in a one liter beaker is cooled in a water bath. Phosgene is bubbled in until a dark precipitate is formed. The phosgene is stopped and stirring is continued until the precipitate is re-dissolved. An additional 2.0 g of sodium bicarbonate is added and phosgenation is continued until electrophoresis shows that the reaction is complete. Finally 1.0 g of sodium bicarbonate is added and the solution is filtered. The filtrate is heated on a steam bath and 70.0 g of sodium acetate trihydrate is added portionwise. The mixture is heated for 30 minutes, cooled and is filtered. The product is washed with a 23% aqueous solution of sodium acetate trihydrate and then thoroughly with ethanol to give 3,3'-ureylenebis[6-(2-amino-8-hydroxy-6-sulfo-1-naphthylazo)benzoic acid], tetrasodium salt.

EXAMPLE 2

5,5'-[ureylenebis(2-carboxy-p-phenyleneazo)]bis[6-amino-4-hydroxy-2-naphthoic acid], TETRASODIUM SALT A solution of 76.0 g of 1,2,3,4-tetrahydro-4-oxo-2-naphthoic acid in 400 ml of concentrated sulfuric acid is obtained by slow addition of the reagent to the rapidly stirred acid at 10° C. Due to the exothermic reaction which follows a methanol-dry ice bath is prepared and held at −20° C to −25° C. The acid solution is cooled to −10° C to −15° C and a solution of 29.8 ml of 70.2% nitric acid in 60 ml of concentrated sulfuric acid is added dropwise over a 30 minute period at this temperature. Stirring is continued at −10° C to −15° C for 15 minutes, then the mixture is poured over 3 liters of crushed ice. The mixture is filtered and the cream solid is partially dried on the filter overnight. The wet product is dissolved in 400 ml of hot methanol, then treated with activated charcoal and is filtered through diatomaceous earth. The filtrate is diluted with 800 ml of hot water and is allowed to cool to 40° C. The crystalline product is filtered, washed with water and is dried in a vacuum dessicator. This product is recrystallized from 900 ml of a 33% aqueous methanol solution after treatment with activated charcoal to give 1,2,3,4-tetrahydro-6-nitro-4-oxo-2-naphthoic acid.

A mixture of 54 g of the above product in 200 ml of methylene chloride is pre-treated with a small amount of anhydrous hydrogen bromide, then a solution of 11.8 ml of bromine in 100 ml of methylene chloride is added at 10°–15°40 C over a 30 minute period. The mixture is evaporated to a paste which is dissolved in acetone, then is treated with activated charcoal and filtered through diatomaceous earth. The filtrate is evaporated to a small volume and diluted with 400 ml of benzene. The solution is concentrated to 400 ml and is allowed to crystallize at room temperature. The product 3-bromo-1,2,3,4-tetrahydro-6-nitro-4-naphthoic acid is collected by filtration as crystals. The filtrate is concentrated to 150 ml and is filtered to obtain additional product.

A mixture of 69.7 g of the combined product above and 16 g of urea in 750 ml of acetonitrile is refluxed for one hour during which a yellow product is crystallized out. The thick mixture is filtered and the product is washed with acetonitrile, then water. The filtrate and acetonitrile wash, plus 8 g of added urea is refluxed for 3.5 hours. The mixture is cooled and the product is filtered and washed as above then dried in a vacuum dessicator to give 4-hydroxy-6-nitro-2-naphthoic acid.

A mixture of 23.32 g of the preceding product and 4.0 g of 10% palladium on charcoal in 500 ml of ethanol is hydrogenated in a Parr shaker over 30 minutes. The mixture is filtered and the product is washed with ethanol, then with ether and is air dried on the filter using a rubber dam to give 6-amino-4-hydroxy-2-naphthoic acid as a solid in the presence of 4.0 g of palladium catalyst. Additional product is recovered by evaporating the filtrate.

To a mixture of one liter of crushed ice, 75 ml of water, 25.5 ml of concentrated hydrochloric acid and 37.5 ml of acetic acid, cooled in an ice-salt bath is added a slightly warm solution of 13.9 g of 5-nitroanthranilic acid, 5.28 g of sodium nitrite and 3.06 g of sodium hydroxide in 350 ml of water. The mixture is stirred in the ice bath for 45 minutes while a solution of 6-amino-4-hydroxy-2-naphthoic acid is prepared. A 22.5 g portion of sodium acetate trihydrate is added to the stirring mixture just prior to coupling. Thus a solution of 15.2 g of 6-amino-4-hydroxy-2-naphthoic acid and 3.0 g of sodium hydroxide in 350 ml of water is added to the previously prepared diazotized 5-nitroanthranilic acid with vigorous stirring. The mixture is stirred for several minutes then is warmed to room temperature and is filtered. The product is washed with water until neutral to give a black paste which is identified as the free diacid of 6-amino-5-(2-carboxy-4-nitrophenylazo)-4-hydroxy-2-naphthoic acid, disodium salt. A 324 g portion of the paste which represents 22.7 g of 6-amino-5-(2-carboxy-4-nitrophenylazo)-4-hydroxy-2-naphthoic acid, disodium salt is dissolved in a solution of 4.8 g of sodium hydroxide in 50 ml of water and is filtered. The filtrate is made up to 500 ml and heated with 21.6 g of sodium sulfide nonahydrate at 65°-70° C for 15 minutes. The solution is cooled to room temperature and 10.3 ml of acetic acid is added. Some precipitated product is redissolved with 12 ml of 5N sodium hydroxide. The solution is filtered to give approximately 520 ml of filtrate. To 336 ml of this solution is added 17 g of anhydrous sodium carbonate. Phosgene is bubbled in until all the carbonate has been neutralized as determined when the mixture will not redissolve on warming. An additional 2 g portion of sodium carbonate is added to redissolve the product and the hot solution is filtered. Electrophoresis shows when the reaction is complete. To the filtrate is added 110 g of sodium acetate trihydrate, the mixture is allowed to stand overnight and is filtered. The product is washed with a 33% aqueous solution of sodium acetate trihydrate then with ethanol and ether. The material on the filter is reprecipitated from 210 ml of water with 60 g of sodium acetate trihydrate and the final product is washed as above to give 5,5'-[ureylenebis(2-carboxy-p-phenyleneazo)]bis-[6-amino-4-hydroxy-2-naphthoic acid], tetrasodium salt.

EXAMPLE 3

4,4'-Ureylenebis[2-(2-amino-8-hydroxy-6-sulfo-1-naphthylazo)benzoic acid], tetrasodium salt A hot solution of 18.2 g of 4-nitroanthranilic acid in 300 ml of water and 22 ml of 5N sodium hydroxide is filtered and 6.9 g of sodium nitrite is added to the filtrate. The resulting solution is poured over a mixture of 34 ml of concentrated hydrochloric acid, 50 ml of acetic acid and 350 g of crushed ice which is cooled in an ice-salt bath. The mixture is stirred for approximately 15 minutes, then a solution of 41 g of sodium acetate trihydrate in 60 ml of water is added followed by a solution of 25 g of 96% 7-amino-1-naphthol-3-sulfonic acid in 24 ml of 5N sodium hydroxide plus 50 ml of water. The mixture is stirred for approximately 5 minutes, then is warmed on a steam bath to 70° C and is filtered through diatomaceous earth. The filtrate is concentrated to approximately 500 ml and 35 g of sodium hydroxide plus 50 g of sodium acetate trihydrate is added. The mixture is filtered and the product is washed with a 33% aqueous solution of sodium acetate trihydrate then with ethanol and ether. The product is dried overnight on the abderhalden at 110° C to give 2-(2-amino-8-hydroxy-6-سulfo-1-naphthylazo)-4-nitrobenzoic acid, disodium salt.

To a solution of 30.0 g of the dry nitro derivative above in 200 ml of water at 35° C is added 25 g of sodium sulfide nonahydrate, portionwise, over a 2-3 minute period. Some of the material is separated out after a few minutes therefore 100 ml of additional water is added and the mixture is heated at 60° C for a total of 25 minutes. The mixture is cooled to room temperature and filtered. To the filtrate is added 11.7 ml of acetic acid and the mixture is filtered through diatomaceous earth. This filtrate is concentrated to 200 ml and treated with 20 g of sodium acetate trihydrate. The product is filtered and washed with a 20% aqueous solution of sodium acetate trihydrate followed by ethanol and ether. The product is dried overnight over phosphorus pentoxide at an elevated temperature and reduced pressure to obtain 4-amino-2-(2-amino-8-hydroxy-6-sulfo-1-naphthylazo)benzoic acid, sodium salt.

Phosgene is bubbled into a solution of 5.0 g of the above product and 2.5 g of sodium carbonate in 110 ml of water until the mixture becomes acidic. An additional 2.5 g of sodium carbonate is added and phosgene is passed in again. The product is salted out with 25 g of sodium acetate trihydrate and is washed with a 33% aqueous solution of sodium acetate trihydrate then with ethanol and ether. The product is dried to provide 4,4'-ureylenebis[2-(2-amino-8-hydroxy-6-sulfo-1-naphthylazo)benzoic acid], tetrasodium salt.

EXAMPLE 4

5,5'-Ureylenebis(2-sulfo-p-phenyleneazo)]bis[6-amino-4-hydroxy-2-naphthoic acid], tetrasodium salt A hot solution of 12.0 g of 2-amino-5-nitrobenzenesulfonic acid, sodium salt in 75 ml of water is filtered through diatomaceous earth and to the filtrate is added 3.5 g of sodium nitrite in 8 ml of water. The resulting warm solution is poured over a mixture of 12.5 ml of concentrated hydrochloric acid, 25 ml of acetic acid and 125 ml of crushed ice, which is cooled in an ice-salt bath. The mixture is stirred for approximately 15 minutes, then 15.2 g of sodium acetate trihydrate in 25 ml of water is added followed by a freshly prepared solution of 10.15 g of 6-amino-4-hydroxy-2-naphthoic acid and 2.1 g of sodium hydride in 125 ml of water. The mixture is cooled to 5° C and filtered. The product is washed with a 33% aqueous solution of sodium acetate trihydrate to give the nitro derivative.

The paste is dissolved in 250 ml of water at 70° C and 18.0 g of sodium sulfide nonahydrate is added. The color of the solution is rapidly changed from purple to deep red, then it is heated on the steam bath for 5 minutes. An 8.5 ml portion of acetic acid is added and the resulting precipitate of the free carboxylic acid is redissolved with 3 g of sodium hydroxide and dilute sodium carbonate. The solution is filtered through diatomaceous earth and concentrated to 150 ml. The product is salted out with 50 g of sodium acetate trihydrate and the mixture is filtered. The product is washed with a 33% aqueous solution of sodium acetate trihydrate followed by ethanol and ether, then is dried overnight over a drying agent at elevated temperature and reduced pressure to give 6-amino-5-(4-amino-2-sulfophenylazo)-4-hydroxy-2-naphthoic acid, disodium salt.

Phosgene is bubbled into a solution of 8.0 g of the preceding product and 4g of sodium carbonate in 175 ml of water at room temperature. After most of the carbonate has been used up and additional 2.0 g of sodium carbonate is added and phosgene is passed in again until electrophoresis indicates that the reaction is complete. The solution is filtered, evaporated to approximately 150 ml and is salted out with 50 g of sodium acetate trihydrate. The mixture is filtered and the product is washed with a 33% aqueous solution of sodium acetate trihydrate followed by ethanol and ether. The product is salted out again from 120 ml of water with 25 g of sodium acetate trihydrate. The mixture is warmed and stirred for 2 hours then is cooled to room temperature to give a more easily filtered product. The product is filtered and is washed with a 16% aqueous solution of sodium acetate trihydrate then with ethanol and ether. The material is then dried to give 5,5'-[ureylenebis(2-sulfo-p-phenyleneazo)]bis[6-amino-4-hydroxy-2-naphthoic acid], tetrasodium salt.

EXAMPLE 5

Preparation of Compressed Tablet

|  | mg./tablet |
|---|---|
| 3,3'-Ureylenebis[6-(2-amino-8-hydroxy-6-sulfo-1-naphthylazo)-benzoic acid], tetrasodium salt | 0.5 – 500 |
| Dibasic Calcium Phosphate NF | qs |
| Starch USP | 40 |
| Modified Starch | 10 |
| Magnesium Stearate USP | 1 – 5 |

EXAMPLE 6

Preparation of Compressed Tablet-Sustained Action

|  | mg./tablet |
|---|---|
| 5,5'-[Ureylenebis(2-carboxy-p-phenyleneazo)]bis[6-amino-4-hydroxy-2-naphthoic acid], tetrasodium salt as aluminum lake,* micronized | 0.5 – 500 as acid equivalent |
| Dibasic Calcium Phosphate NF | qs |
| Alginic Acid | 20 |
| Starch USP | 35 |
| Magnesium Stearate USP | 1 – 10 |

*Complement inhibitor as sodium salt plus aluminum sulfate yields aluminum complement inhibitor. Complement inhibitor content is aluminum lake ranges from 5 – 30%.

EXAMPLE 7

Preparation of Hard Shell Capsule

|  | mg./capsule |
|---|---|
| 4,4'-Ureylenebis[2-(2-amino-8-hydroxy-6-sulfo-1-naphthylazo)-benzoic acid], tetrasodium salt | 0.5 – 500 |
| Lactose, Spray Dried | qs |
| Magnesium Stearate | 1 – 10 |

EXAMPLES 8

Preparation of Oral Liquid (Syrup)

|  | % w/v |
|---|---|
| 5,5'-[Ureylenebis(2-sulfo-p-phenyleneazo)]bis[6-amino-4-hydroxy-2-naphthoic acid], tetrasodium salt | 0.05 – 5 |
| Liquid Sugar | 75.0 |
| Methyl Paraben USP | 0.18 |
| Propyl Paraben USP | 0.02 |
| Flavoring Agent | qs |
| Purified Water qs ad | 100.0 |

EXAMPLE 9

Preparation of Oral Liquid (Elixir)

|  | % w/v |
|---|---|
| 3,3'-Ureylenebis[6-(2-amino-8-hydroxy-6-sulfo-1-naphthylazo)-benzoic acid], tetrasodium salt | 0.05 – 5 |
| Alcohol USP | 12.5 |
| Glycerin USP | 45.0 |
| Syrup USP | 20.0 |
| Flavoring Agent | qs |
| Purified Water qs ad | 100.0 |

EXAMPLE 10

Preparation of Oral Suspension (Syrup)

|  | % w/v |
|---|---|
| 5,5'-[Ureylenebis(2-carboxy-p-phenyleneazo)]bis[6-amino-4-hydroxy-2-naphthoic acid], tetrasodium salt as aluminum lake, micronized | 0.05 – 5 (acid equivalent) |
| Polysorbate 80 USP | 0.1 |
| Magnesium Aluminum Silicate, Colloidal | 0.3 |
| Flavoring Agent | qs |
| Methyl Paraben USP | 0.18 |
| Propyl Paraben USP | 0.02 |
| Liquid Sugar | 75.0 |
| Purified Water qs ad | 100.0 |

EXAMPLE 11

Preparation of Injectable Solution

|  | % w/v |
|---|---|
| 4,4'-Ureylenebis[2-(2-amino-8-hydroxy-6-sulfo-1-naphthylazo)benzoic acid], tetrasodium salt | 0.05 – 5 |
| Benzyl Alcohol NF | 0.09 |
| Water for Injection | 100.0 |

EXAMPLE 12

Preparation of Injectable Oil

|  | % w/v |
|---|---|
| 5,5'-[Ureylenebis(2-sulfo-p-phenyleneazo)]bis[6-amino-4-hydroxy-2-naphthoic acid], tetrasodium salt | 0.05 – 5 |
| Benzyl Alcohol | 1.5 |
| Sesame Oil qs ad | 100.0 |

EXAMPLE 13

Preparation of Injectable Depo Suspension

|  | % w/v |
|---|---|
| 3,3'-Ureylenebis[6-(2-amino-8-hydroxy-6-sulfo-1-naphthylazo)benzoic acid], tetrasodium salt as aluminum lake, micronozed | 0.05 – 5 (acid equivalent) |
| Polysorbate 80 USP | 0.2 |
| Polyethylene Glycol 4000 USP | 3.0 |
| Sodium Chloride USP | 0.8 |
| Benzyl Alcohol NF | 0.9 |
| HCl to pH 6-8 | qs |
| Water for Injection qs ad | 100.0 |

The compounds of this invention may be administered internally, e.g., orally or parenterally, e.g., intra-articularly, to a warm-blooded animal to inhibit complement in the body fluid of the animal, such inhibition being useful in the amelioration or prevention of those reactions dependent upon the function of complement, such as inflammatory process and cell membrane damage induced by antigen-antibody complexes. A range of doses may be employed depending on the mode of administration, the condition being treated and the particular compound being used. For example, for intravenous or subcutaneous use from about 5 to about 50 mg./kg./day, or every 6 hours for more rapidly excreted salts, may be used. For intra-articular use for large joints such as the knee, from about 2 to about 20 mg./joint per week may be used, with proportionally smaller doses for smaller joints. The dosage range is to be adjusted to provide optimum therapeutic response in the warm-blooded animal being treated. In general, the amount of compound administered can vary over a wide range to provide from about 5 mg./kg. to about 100 mg./kg. of body weight of animal per day. The usual daily dosage for a 70 kg. subject may vary from about 350 mg. to about 3.5 g. Unit doses of the acid or salt can contain from about 0.5 mg. to about 500 mg.

In therapeutic use the compounds of this invention may be administered in the form of conventional pharmaceutical compositions. Such compositions may be formulated so as to be suitable for oral or parenteral administration. The active ingredient may be combined in admixture with a pharmaceutically acceptable carrier, which carrier may take a wide variety for forms depending on the form of preparation desired for administration, i.e., oral or parenteral. The compounds can be used in compositions such as tablets. Here, the principal active ingredient is mixed with conventional taletting ingredients such as corn starch, lactose, sucrose, sorbitol, talc, stearic acid, magnesium stearate, dicalcium phosphate, gums, or similar materials as non-toxic pharmaceutically acceptable diluents or carriers. The tablets or pills of the novel compositions can be laminated or otherwise compounded to provide a dosage form affording the advantage of prolonged or delayed action of predetermined successive action of the enclosed medication. For example, the tablet or pill can comprise an inner dosage, an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating. The tablet or pill may be colored through the use of an appropriate non-toxic dye, so as to provide a pleasing appearance.

The liquid forms in which the novel compositions of the present invention may be incorporate for administration include suitable flavored emulsions with edible oils, such as, cottonseed oil, sesame oil, coconut oil, peanut oil, and the like as well as elixirs and similar pharmaceutical vehicles. Sterile suspensions or solutions can be prepared for parenteral use. Isotonic preparations containing suitable preservatives are also desirable for injection use.

the term dosage form as described herein refers to physically discrete units suitable as unitary dosage for warm-blooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specifications. Examples of suitable oral dosage forms in accord with this invention are tablets, capsules, pills, powders, packets, granules, wafers, cachets, teaspoonfuls, dropperfuls, ampules, vials, segragated multiples of any of the foregoing and other forms as herein described.

The complement inhibiting activity of representative compounds of this invention has been demonstrated by one or more of the following identified tests: (i) Test, Code 026 (Cl inhibitor). This test measures the ability of activated human Cl to destroy fluid phase human C2 in the presence of C4 and appropriate dilutions of the test compound. An active inhibitor protects C2 from C1 and C4; (ii) Test, Code 035 (C3-C9 inhibitor) - This test determines the ability of the late components of human complement (C3-C9) to lyse EAC 142 in the presence of appropriate dilutions of the test compound. An active inhibitor protects EAC 142 from lysis of human C3-C9; (iii) Test, Code 036 (C-Shunt inhibitor) - In this test human erythrocytes rendered fragile are lysed in autologous serum via the shunt pathway activated by cobra venom factor in the presence of appropriate dilutions of the test compound.

Inhibition of the shunt pathway results in failure of lysis; (iv) Forssman Vasculitis Test - Here, the well known complement dependent lesion, Forssman vasculitis, is produced in guinea pigs by intradermal injection of rabbit anti-Forssman antiserum. The lesion is measured in terms of diameter, edema and hemorrhage and the extent to which a combined index of these is inhibited by prior intraperitoneal injection of the test compound at 200 mg./kg. is then reported, unless otherwise stated; (v) Forssman Shock Test - Lethal shock is produced in guinea pigs by an i.v. injection of anti-Forssman antiserum and the harmonic mean death time of treated guinea pigs is compared with that of simultaneous controls; (vi) Complement Level Reduction Test - In this test, the above dosed guinea pigs, or others, are bledfor serum and the complement level is determined in undiluted serum by the capillary method of U.S. Patent No. 3,876,376 and compared to undosed guinea pigs; and (vii) Cap 50 Test - Here, appropriate amounts of the test compound are added to a pool of guinea pig serum in vitro, to above is run. The concentration of compound inhibiting 50 percent is reported.

TABLE I

| | Biological Activities | | | |
| --- | --- | --- | --- | --- |
| | Assay Results | | | |
| | In Vitro | | In Vivo | |
| Compound | 026* | 035 | Forssman | % Reduction Complement |
| 3,3'-ureylenebis[6-(2-amino-8-hydroxy-6-sulfo-1-naphthylazo)benzoic acid], tetrasodium salt. | +5** | +2 | 73 | 79 |
| 4,4'-ureylenebis[2-(2-amino-8-hydroxy-6-sulfo-1-naphthylazo)benzoic acid], tetrasodium salt. | Neg. | +1 | 13 | 21 |
| 5,5'-[ureylenebis(2-carboxy-p-phenyleneazo)]-bis[6-amino-4-hydroxy-2-naphthoic acid], tetrasodium salt. | +5 | +3 | 38 | 72 |
| 5,5'-[ureylenebis(2-sulfo-p-phenyleneazo)]-bis[6-amino-4-hydroxy-2-naphthoic acid], tetrasodium salt. | | | | |

*Tests identified by code herein.
**5 = Activity 5 wells, a serial dilution assay; higher well number indicates higher activity. The serial dilutions are two-fold.

We claim:
1. A compound selected from those of the formula:

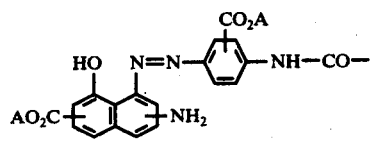

-continued

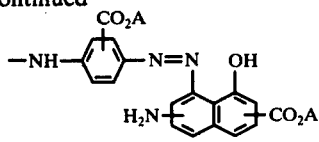

wherein A is H, Na or K, with the proviso that A is identical in the same compound.

2. A compound selected from those of the formula:

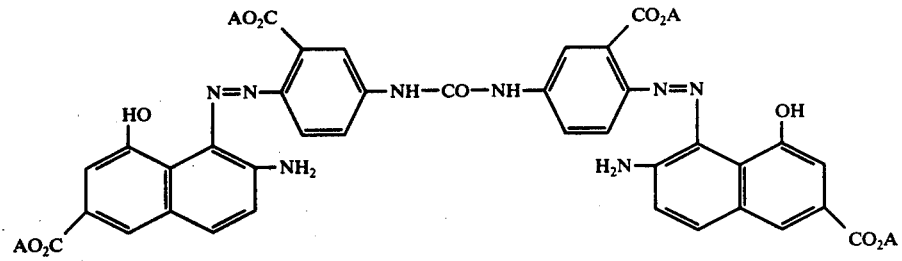

wherein A is H, Na or K, with the proviso that A is identical in the same compound.

3. A compound to claim 2, 5,5'-(2-carboxy-p-phenyleneazo), tetrasodium salt.

* * * * *

UNITED STATES PATENT OFFICE
CERTIFICATE OF CORRECTION

Patent No. 4,049,640          Dated September 20, 1977

Inventor(s) Ransom B. Conroy et al.

It is certified that error appears in the above-identified patent and that said Letters Patent are hereby corrected as shown below:

Column 14, line 41, claim 3 should read:

-- 3. A compound to claim 2, 5,5'-[ureylenebis(2-carboxy-p-phenyleneazo)]bis[6-amino-4-hydroxy-2-naphthoic acid], tetrasodium salt.--

Signed and Sealed this

Thirty-first Day of January 1978

[SEAL]

Attest:

RUTH C. MASON
Attesting Officer

LUTRELLE F. PARKER
Acting Commissioner of Patents and Trademarks